United States Patent [19]

Laufer

[11] 4,133,498
[45] Jan. 9, 1979

[54] DRIVE DEVICE FOR A TAPE RECORDER

[75] Inventor: Helmut Laufer, St. Georgen, Fed. Rep. of Germany

[73] Assignee: Dual Gebrüder Steidinger, St. Georgen, Fed. Rep. of Germany

[21] Appl. No.: 848,598

[22] Filed: Nov. 4, 1977

[51] Int. Cl.$^2$ .................. G03B 1/04; G11B 15/32
[52] U.S. Cl. ...................................... 242/201; 74/323
[58] Field of Search ............... 242/200, 201, 202, 204, 242/206–210, 67.4; 360/71, 73; 74/321, 323, 324

[56] References Cited

U.S. PATENT DOCUMENTS

| | | | |
|---|---|---|---|
| 1,655,299 | 1/1928 | Thornton | 242/65 |
| 3,652,030 | 3/1972 | Nakano | 242/201 |
| 3,758,049 | 9/1973 | Staar | 242/201 |
| 3,976,263 | 8/1976 | Suzuki | 242/201 |
| 4,046,334 | 9/1977 | Kato et al. | 242/201 |

*Primary Examiner*—Leonard D. Christian
*Attorney, Agent, or Firm*—Martin A. Farber

[57] ABSTRACT

A drive device for a tape recorder by which the recording tape is drawn off one spool by means of a capstan, and is wound-up on another spool, which is driven over a friction coupling by a motor with a speed not substantially above the highest required winding speed, with a drive device driven by the same motor, the drive device for the purpose of fast rewinding being selectively coupleable on one of the two spools. The two drive gears are arranged on a swingable carrier arm driven continuously in oppsite working directions by a stationarily arranged motor via a belt. By swinging the carrier arm in opposite operating directions out of a neutral center position, the drive gears are coupleable from time to time with one of the spool-carrying winding spindles for fast rewinding. One of the drive gears, which is coaxially seated over a friction clutch, is connected with another drive gear of smaller diameter, the latter in a neutral center position of the carrier arm being able to be brought into engagement with still another drive gear by means of an axial movement of one of these other drive gears, said still another drive gear being coaxially seated on the winding spindle which carries the spool which in the play-operation serves as the winding-up spool.

5 Claims, 3 Drawing Figures

DRIVE DEVICE FOR A TAPE RECORDER

The invention relates to a drive device of a tape recorder, in general, and to a drive device for a tape recorder by which the recording tape is drawn off one spool by means of a so-called capstan or driving spindle and is wound up on another spool, which is driven over a friction coupling by a motor with a speed which is not substantially above the highest required winding-up speed, with a drive device which is driven by the same motor. The drive device for fast rewinding is selectively coupleable with one of the two spools.

For drive devices of this type very many embodiment types are known. Depending upon the expense and output or efficiency, such types are more or less different. Differences also exist between battery operation and power mains supply line operation. Most of the drive devices require a comparatively high mechanical expense. An apparently simple arrangement resides in the motor for fast rewind being selectively coupleable, by means of a friction drive, directly, and respectively, via an intermediate gear, with the tape spools (German Gbm No. 17 67 225). The disadvantage of such an arrangement is that for the drive connection, the motor itself or the tape spools must be shifted. It is true that this can be avoided by a displaceable friction wheel (German Gbm No. 17 67 014), and respectively, a belt (Funktechnik No. 7, 1956, pages 186–188) at the position of the motor shaft. The disadvantage of such an arrangement is that the normal winding-up drive, which runs substantially slower, only can take place with additional gear reduction means or must be fed from the relatively slowly running capstan or driving spindle by means of a belt, whereby energy losses may not be avoided during fast rewind, since such a belt drive may not be completely decoupled. Also a solution is known (German Auslegeschrift AS No. 18 16 681) by which this belt drive need not be decoupled since it can also be used for fast rewinding. However this has the disadvantage that for fast rewinding a further drive belt is necessary and during playback many gears are in engagement. Furthermore an arrangement is known (German Offenlegeschrift OS No. 24 38 482) by which a stationarily arranged motor drives a displaceable friction wheel via a belt. The displacement of the friction wheel here serves for the drive connection for the normal forward running. For the drive connection for fast rewinding, between the displaceable friction wheel, which during fast rewinding is in the decoupled position of the normal forward running, and between the spool plates, one or two intermediate gears or wheels are selectively connected. The complete decoupling of the forward drive here is attained by a decided additional expenditure.

It is an object of the present invention to simplify such a drive device while retaining the previously known optimum drive characteristics.

It is another object of the present invention to provide a drive device for a tape recorder by which the recording tape is drawn off one spool by means of a so-called capstan or driving spindle and is wound up on another spool, which is driven over a friction coupling by a motor with a speed which is not substantially above the highest required winding-up speed, with a drive device which is driven by the same motor. The drive device for fast rewinding is selectively coupleable on one of the two spools. In cooperation with the above, the invention is characterized by arranging two drive gears (5, 6) on a swingable (pivotable) carrier arm (e.g., 2), the two drive gears (5, 6) being driven continuously in opposite working directions by a stationarily arranged motor (25) over a belt (7). By means of swinging of the carrier arm (2) in opposite operating directions out from a neutral center position, the drive gears are coupleable respectively from time to time with one of the spool carrying winding spindles (e.g., 9 via 11 or 8 via 10) for the purpose of fast rewinding; and one of the drive gears (5) which is coaxially seated over a friction clutch is connected with another drive gear (20) of smaller diameter, the latter with a neutral center position of the carrier arm (2) being able to be brought into engagement with a drive gear (12) by means of an axial movement of one of these drive gears (12, 20). The drive gear (12) is coaxially seated on the winding spindle (8), and the winding spindle (8) carries the spool which serves in the play-operation as the winding-up spool.

It is another object of the present invention to provide a drive device as mentioned above in which the drive gear (12) is displaceably arranged on the axle of the winding spindle (8) and is coupled with a slider (13) (the latter being actuatable by means of an operating element (16)) such that the drive gear (12) comes into engagement with the third drive gear (20) upon movement of the slider (13) in the direction of the winding spindles (8, 9). Further the slider (13) has a projection (18), which engages in a recess (19) of the carrier arm (2) upon displacement in the previously-mentioned direction such that it locks the carrier arm against a pivoting about its pivot axis (3).

The simplification in accordance with the present invention is brought about in the following manner. Only one single pivotable carrier arm (lever) for the drive gears and the axial displacement of a drive gear is necessary to effect the different drive connections, whereby the displacement can take place by a part which is to be moved anyhow, such as the head carrier plate which is necessary as a rule with cassette recorders.

With the above and other objects and advantages in view, the present invention will become more clearly understood in connection with the following detailed description of a preferred embodiment, when considered with the accompanying drawing, of which:

Figure 1:
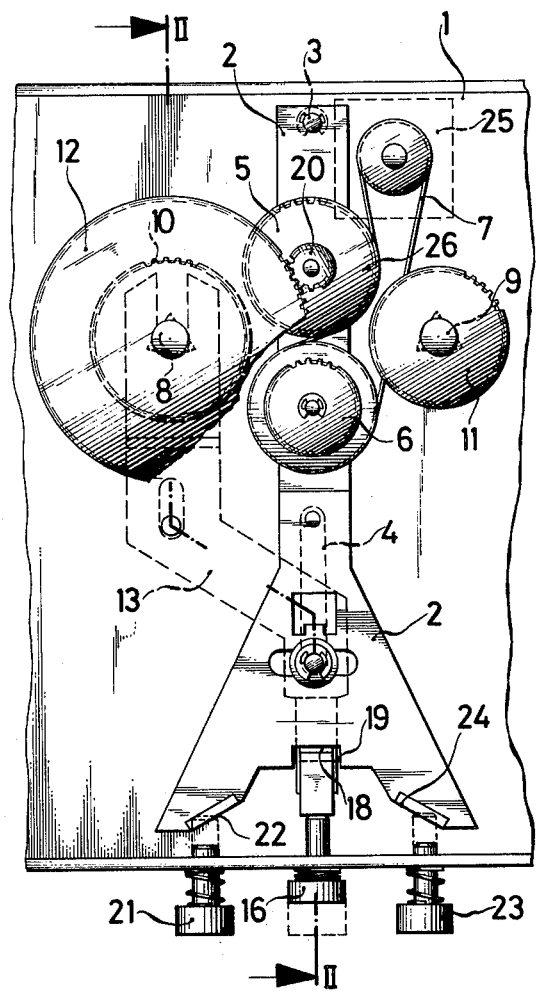
FIG. 1 is a bottom view of a tape recorder with the essential parts of the drive device with one of the gears partly broken away.

Referring now to the drawings, a carrier arm 2 is pivotably mounted about an axle 3 on a base plate 1. It is held by a spring 4 in its illustrated center position and carries two drive gears 5 and 6 which are driven by means of a drive belt 7 by a motor 25. Further, two winding spindles 8, 9 which receive the tape spools are mounted with their drive wheels or gears 10, 11, respectively, on the base plate 1. The winding spindle 8 which winds-up the spool during "record" or "playback" furthermore carries a drive gear 12, the latter being displaceably arranged on its axle. A slider 13 is arranged on the base plate 1 (the slider being a part of a displaceable carrier plate for the sound head which is not illustrated any further) and by means of an operating element 16 is displaceable against the action of a spring 17.

Figure 2:
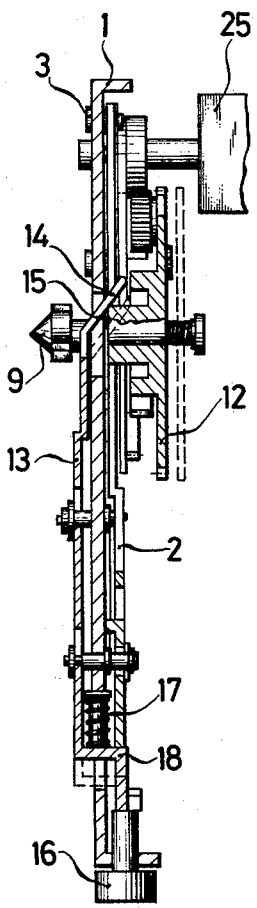
FIG. 2 is a sectional view taken along the lines II—II in FIG. 1.
Figure 3:
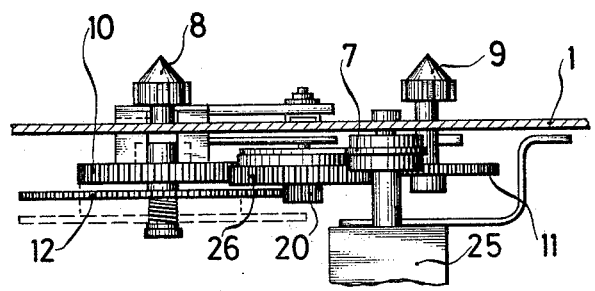
FIG. 3 is a rear side view.

The slider 13 has a slotted or forked free end which is slidably disposed about the winding spindle 8 and has an inclined surface 14 which abuts against a collar 15 of the axially displaceable drive gear 12, in order to be able to axially shift the latter. The inclined surface 14 extends inclined through an opening in the base plate 1. The drive gear 12 is spring biased (FIGS. 2 and 3) so that the collar 15 abuts the inclined surface 14 of the slider. Additional slots in the slider 13 and pins through the base plate 1 guide the slider 13 during its displacement.

The position of the drive device as illustrated corresponds to "record" or "playback", that is the corresponding operating element 16 is actuated. The slider 13 is inserted with a projection or stepped portion 18 into a recess 19 of the carrier arm 2 and it consequently locks the latter with respect to its pivot position. In this position of the slider 13, the drive gear 12 of the winding spindle 8 is located in engagement with a drive gear 20 of a small diameter. The drive gear 20 is connected with the belt-driven drive gear 5 via a friction clutch 26, the latter being disposed inside of the drive gear 5.

If an operating element 21 for fast forward running is actuated, thus in a known manner which is not further illustrated, the operating element 16 springs back into its starting position. Under the influence of the spring 17 the slider 13 follows it, which slider with its inclined surface 14 brings the drive wheel 12 axially into its decoupled position (that is in the position illustrated in dashed lines in FIGS. 2 and 3). Simultaneously the projection 18 of the slider 13 leaves the recess 19 of the carrier arm 2, so that the latter is pivoted in the clockwise sense under the pressure of the operating element 21 against its inclined face 22, and consequently brings the belt-driven drive gear 5 into engagement with the drive gear 10 of the winding spindle 8 for the purpose of the fast forward running.

By actuation of an operating service element 23, a corresponding operation takes place, whereby the belt-driven drive wheel 6 comes into gearing engagement with the drive gear 11 of the winding spindle 9 and consequently a fast rewind takes place.

The spring 4 always acts in a direction to return the carrier arm 2 back into its illustrated starting position, if it is shifted. Such a center position, however, calls for a locking, since the restoring force at the center position in functionally-dependent manner approximates the value O. The locking in the center position takes place in a particularly economical manner, since it is brought about by means of a part, such as the slider 13, and respectively, the head carrier plate. This part already is present without any more being provided, and is correspondingly moved.

While there has been disclosed one embodiment of the present invention, it is to be understood that this embodiment is given by example only and not in a limiting sense.

I claim:

1. A tape recorder, comprising
    a first winding spindle and a second winding spindle for receiving respective spools of a recordable tape rewindable from one of the spools onto a second of the spools,
    a first drive gear coaxially connected with said first winding spindle.
    a second drive gear coaxially connected with said second winding spindle,
    drive means for driving said first winding spindle with a speed which is not substantially over that for winding up the tape during playback, comprising
    a stationarily mounted motor,
    a carrier arm pivotally mounted about a pivot axis,
    a third drive gear,
    a fourth drive gear,
    said third and fourth drive gears being mounted on said carrier arm,
    a belt means operatively connected to said motor and to said third and fourth drive gears for driving said third and said fourth drive gears in opposite working directions via said motor,
    a first operating means upon actuation thereof for moving said carrier arm in a left operating position in which said third drive gear stands in operative connection with said first drive gear, thereby consequently driving the latter with said first winding spindle connected therewith for fast forward winding,
    a second operating means for moving said carrier arm into a right operative position in which said fourth drive gear stands in operative connection with said second drive gear, thereby consequently driving the latter with said second winding spindle connected therewith for fast rewind,
    a fifth drive gear arranged coaxially to said third drive gear,
    a friction clutch operatively disposed between said fifth and said third drive gears,
    a sixth drive gear being mounted coaxially to said first drive gear and displaceable in a direction of its axis,
    a slider moveably disposed in a direction perpendicularly to the axes of said drive gears and including means for axially displacing said sixth drive gear such that upon movement of said slider in a first direction towards said drive gears, said sixth drive gear engages with said fifth drive gear, and
    a third operating means for displacing of said slider.
2. The tape recorder as set forth in claim 1, wherein
    said slider has a projection thereon,
    said carrier arm is formed with a recess,
    said projection of said slider is inserted in said recess and said slider locks said carrier arm with respect to a rotation about said pivot axis upon actuation of said third operating means.
3. The tape recorder as set forth in claim 1, wherein said fifth drive gear has a smaller diameter than that of said third drive gear.
4. The tape recorder as set forth in claim 1, wherein said first, second and third operating means are adapted for being actuated only one at a time.
5. The tape recorder as set forth in claim 1, wherein
    said axially displacing means constitutes an inclined surface on said slider,
    said sixth drive gear is formed with a collar slidably abutting said inclined surface on said slider, whereby said sixth drive gear is axially displaced upon displacement of said slider.

* * * * *